(12) United States Patent
Dyson et al.

(10) Patent No.: US 6,814,213 B2
(45) Date of Patent: Nov. 9, 2004

(54) BEARING HOUSING AND ROLLER SHAFT SEAL

(75) Inventors: Kingsley Bruce Dyson, Lesmurdie (AU); Derek Alfred Sealey, Padbury (AU)

(73) Assignee: JLV Industries Pty LTD, Myaree (AU)

( * ) Notice: Subject to any disclaimer, the term of this patent is extended or adjusted under 35 U.S.C. 154(b) by 24 days.

(21) Appl. No.: 10/258,360

(22) PCT Filed: Apr. 11, 2001

(86) PCT No.: PCT/AU01/00413

§ 371 (c)(1),
(2), (4) Date: Nov. 25, 2002

(87) PCT Pub. No.: WO01/81798

PCT Pub. Date: Nov. 1, 2001

(65) Prior Publication Data

US 2003/0183480 A1 Oct. 2, 2003

(30) Foreign Application Priority Data

Apr. 19, 2000 (AU) .............................................. PQ7035

(51) Int. Cl.⁷ .......................... B65G 39/09; F16J 15/32; F16C 35/04
(52) U.S. Cl. .......................... 193/37; 384/144; 384/480
(58) Field of Search .......................... 193/37; 384/144, 384/146, 478, 480, 484

(56) References Cited

U.S. PATENT DOCUMENTS

| 1,362,910 A | * | 12/1920 | Zoeller et al. ............... 384/546 |
| 3,086,826 A | * | 4/1963 | Gunnell ........................ 384/418 |
| 4,121,694 A | * | 10/1978 | Nelson ............................ 184/6 |
| 4,339,158 A | * | 7/1982 | Greener et al. ............. 384/489 |
| 4,458,957 A | * | 7/1984 | Greener ........................ 384/538 |
| 5,074,408 A | * | 12/1991 | Smith et al. ................. 198/842 |
| 5,156,443 A |   | 10/1992 | Ide |
| 5,188,214 A | * | 2/1993 | Uttke et al. .................. 198/501 |
| 5,261,528 A | * | 11/1993 | Bouchal ....................... 198/842 |
| 5,380,104 A | * | 1/1995 | Garnett ........................ 384/546 |
| 5,433,308 A | * | 7/1995 | Gagnon ........................ 193/37 |
| 5,642,800 A | * | 7/1997 | East .............................. 193/37 |
| 5,944,161 A | * | 8/1999 | Sealey .......................... 193/37 |
| 6,148,986 A | * | 11/2000 | Brink et al. .................. 193/37 |
| 6,206,182 B1 | * | 3/2001 | Wilson et al. .............. 198/842 |
| 6,209,702 B1 | * | 4/2001 | Agnoff ......................... 193/37 |
| 6,234,293 B1 | * | 5/2001 | Fasoli .......................... 193/37 |
| 6,287,014 B1 | * | 9/2001 | Salla ........................... 384/546 |
| 6,454,077 B2 | * | 9/2002 | Nimmo et al. ................ 193/37 |
| 6,547,054 B2 | * | 4/2003 | Gamache ..................... 193/37 |

FOREIGN PATENT DOCUMENTS

WO        WO 96/16884 A      6/1996

OTHER PUBLICATIONS

Derwent Abstract Accession No. 95-335415/43, RU 2031288 C1 (Zheltunov) Mar. 20, 1995.

* cited by examiner

Primary Examiner—Douglas Hess
(74) Attorney, Agent, or Firm—Dougherty, Clements, Hofer & Bernard

(57) ABSTRACT

A molded plastics bearing housing for receiving a roller bearing which is press-fitted into and end of a conveyor roller tube is disclosed. The body portion of the housing extends radially inward as neck portion terminates in two rims, one rim sealing against the shaft supporting the conveyor roller and the other sealing against an inner race of the bearing. Both sealing rims are curved in section so as to make low angles with the roller shaft and bearing. The flexibility of this sealing arrangement absorbs axial movements between the conveyor shaft and the roller.

12 Claims, 4 Drawing Sheets

BEARING HOUSING AND ROLLER SHAFT SEAL

FIELD OF THE INVENTION

The present invention relates to a bearing housing and roller shaft seal. More particularly, the bearing housing and roller shaft seal of the present invention are intended to increase the capacity of the bearing housing and seal to compensate for axial movement in the roller.

BACKGROUND ART

A polyurethane end cap assembly for the roller tube of conveyor rollers is described in Australian Patent 686028 to the present applicant. The end cap assembly is described as comprising an end cap body which is interference fitted within an end of a roller tube and in which is received a bearing. The bearing is fitted within the end cap body from an inner side of the end cap body, thereby minimising the exposure of the bearing to dust and dirt from outside the conveyor roller. A removable inner seal means is snap fitted within the end cap body behind the bearing and acts to seal the bearing from any dust and dirt within the conveyor roller. The outer face of the bearing is sealed by an inner collar portion of the end cap body which projects inwardly towards the roller shaft and on which are provided a pair of arms. One of these arms engages a radially inner race of the bearing whilst the other engages the shaft.

In such an arrangement, dust and dirt from outside the end cap assembly must penetrate past both arms to reach the bearing. In addition, the space between the arms, and the space between the neck portion of the end cap body and the bearing constitute a grease trap to further prevent the passage of dust and dirt to the bearing. Further, a dust seal is press fitted to the roller shaft externally to the end cap body and projections provided thereon engage lightly an outer surface of the end cap body allowing free rotation of one relative to the other, but providing an initial barrier to the ingress of dust and dirt to the end cap assembly.

Whilst the end cap assembly described in Australian Patent 686028 operates well to prevent the ingress of dust and dirt to the bearing housed within the end cap body, the manner in which the various seals are effected does not allow the end cap assembly to effectively deal with axial movement generated within the conveyor roller through relative movement between the roller and shaft. Such movement tends to decrease the efficiency of the various seals, as the arms that impinge upon either the shaft or the inner race of the bearing are fairly thick and rigid and impinge upon their respective surface at a steep angle. This requires precise manufacturing tolerances when constructing the end cap assembly in an effort to establish and maintain the various seals.

Axial movement and/or radial loads within the conveyor roller can act to either decrease the effectiveness of a seal or increase drag between the stationary inner race of the bearing or the roller shaft, and the rotating end cap body.

The bearing housing and roller shaft seal of the present invention have as one object thereof to substantially overcome the above problems associated with the prior art, or to at least provide a useful alternative thereto.

The preceding discussion of the background art is intended to facilitate an understanding of the present invention only. It should be appreciated that the discussion is not an acknowledgement or admission that any of the material referred to was part of the common general knowledge in Australia as at the priority date of the application.

Throughout this specification, unless the context requires otherwise, the word "comprise", or variations such as "comprises" or "comprising" will be understood to imply the inclusion of a stated integer or group of integers, but not the exclusion of any other integer or group of integers including method steps.

DISCLOSURE OF THE INVENTION

In accordance with the present invention there is provided a bearing housing comprising a body portion proportioned to receive therein a bearing, the body portion having an inwardly projecting neck portion in turn provided with a terminal portion having an annular bearing seal rim and an annular shaft seal rim, wherein the terminal portion of the neck portion is flexible relative to the remainder of the body portion.

The or each bearing seal rim preferably curves rearwardly and inwardly to impinge upon an inner race of a bearing held within the bearing housing. Further, the or each shaft seal rim preferably curves forwardly and inwardly to impinge upon a roller shaft about which the bearing housing is rotatably arranged.

Still preferably, each seal rim impinges upon its respective seal surface at a gentle or low angle, this low angle being facilitated by the curved nature of the seal rims. The low angle is preferably below 90°. Still further preferably, the low angle is below 45°.

An annular inner seal means is preferably press or snap fitted into a rear face of the bearing housing and forms a seal with the inner race of the bearing.

In accordance with the present invention there is further provided an end cap assembly for the roller tube of a roller conveyor, the end cap assembly comprising a body portion, an annular inner seal means, a bearing, and an annular dust seal, wherein the body portion is proportioned to receive therein the bearing, the body portion having an inwardly projecting neck portion in turn provided with a terminal portion having an annular bearing seal rim and an annular shaft seal rim, wherein the terminal portion of the neck portion is flexible relative to the remainder of the body portion.

The or each bearing seal rim preferably curves rearwardly and inwardly to impinge upon an inner race of a bearing held within the bearing housing. Further, the or each shaft seal rim preferably curves forwardly and inwardly to impinge upon a roller shaft about which the bearing housing is rotably arranged.

Still preferably, each seal rim impinges upon its respective seal surface at a gentle or low angle, this low angle being facilitated by the curved nature of the seal rims. The low angle is preferably below 90°. Still further preferably, the low angle is below 45°.

The annular inner seal means is preferably press or snap fitted into a rear face of the bearing housing and forms a seal with the inner race of the bearing. The dust seal preferably abuts an outer surface of the body portion. Still preferably, a labyrinth seal is formed thereby.

BRIEF DESCRIPTION OF THE DRAWINGS

The bearing housing and roller shaft seal of the present invention will now be described, by way of example only, with reference to one embodiment thereof and the accompanying drawings, in which.

BEST MODE(S) FOR CARRYING OUT THE INVENTION

Figure 1:
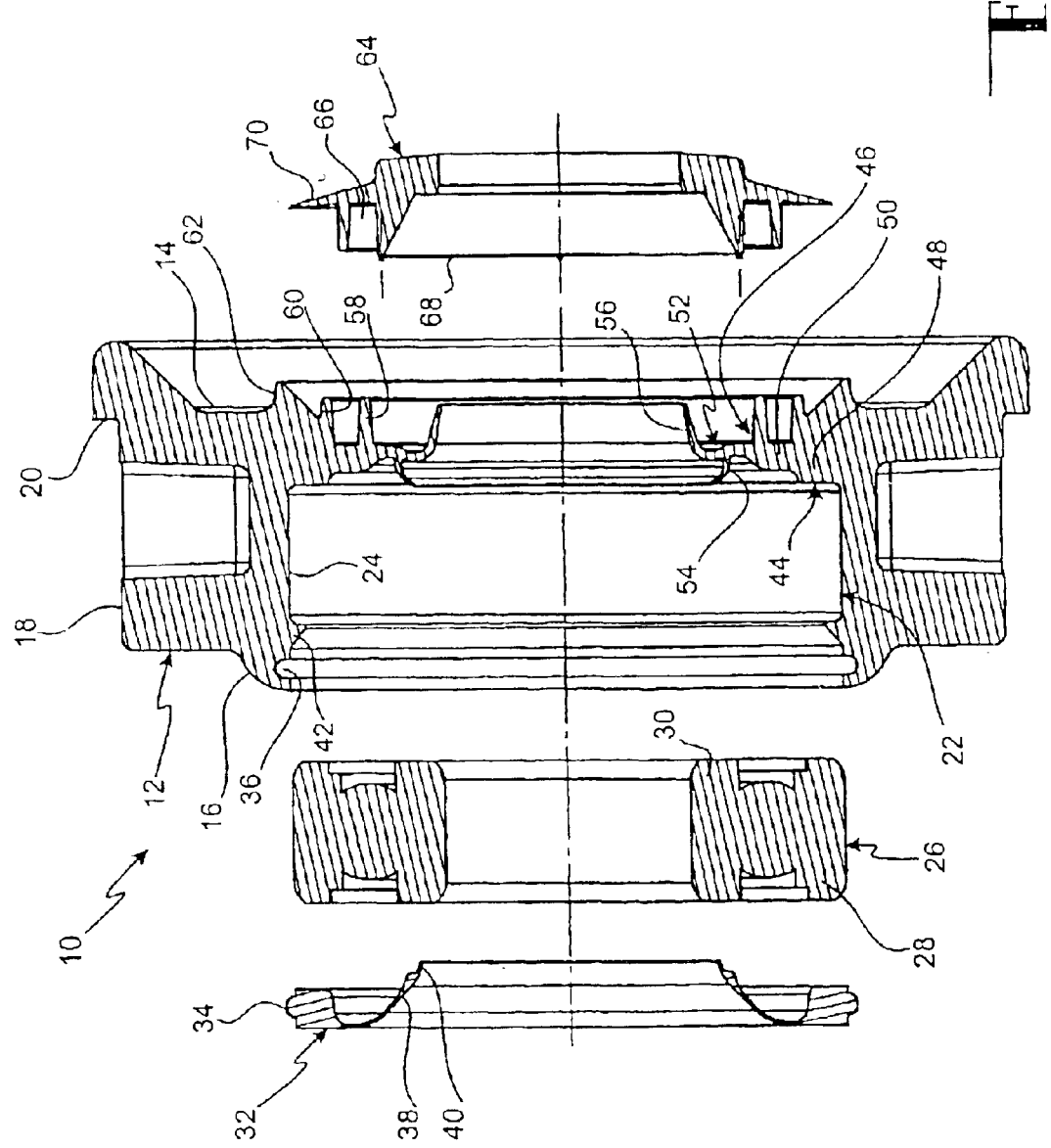
FIG. 1 is an exploded cross-sectional view of a bearing housing in accordance with the present invention, showing a dust seal adjacent a forward face of the bearing housing and also showing a bearing prior to press-fitting within the bearing housing.

In FIGS. 1 to 4 there is shown a bearing housing 10 in accordance with the present invention, the bearing housing 10 comprising an annular body portion 12 having a forward face 14 and rear face 16. An outer surface 18 of the body portion 12 has a shoulder 20 provided therein. An inner surface 22 of the body portion 12 provides a bearing seat 24 to receive a bearing 26. The bearing 26 comprises a radially outer race 28 and a radially inner race 30.

An annular inner seal means 32 is provided with a circumferential outer projection 34 arranged to be located in a complimentary seat 36 provided in the body portion 12 of the bearing housing 10. The annual seal means 32 further comprises an inwardly and forwardly projecting rim 38 having a rim tip 40 arranged to impinge upon the inner race 30 of the bearing 26.

The bearing seat 24 is bordered by a rearward shoulder 42 and a forward shoulder 44. The bearing 26 is press or interference fitted within the body portion 12 over the rearward shoulder 42 and into the bearing seat 24. The annular seal means 32 may subsequently be fitted into the rear face 16 to engage with the complimentary recess 36 therein. The body portion 12 further comprises an annular inwardly projecting neck portion 46 which is integrally formed with the remainder of the body portion 12.

Figure 4:
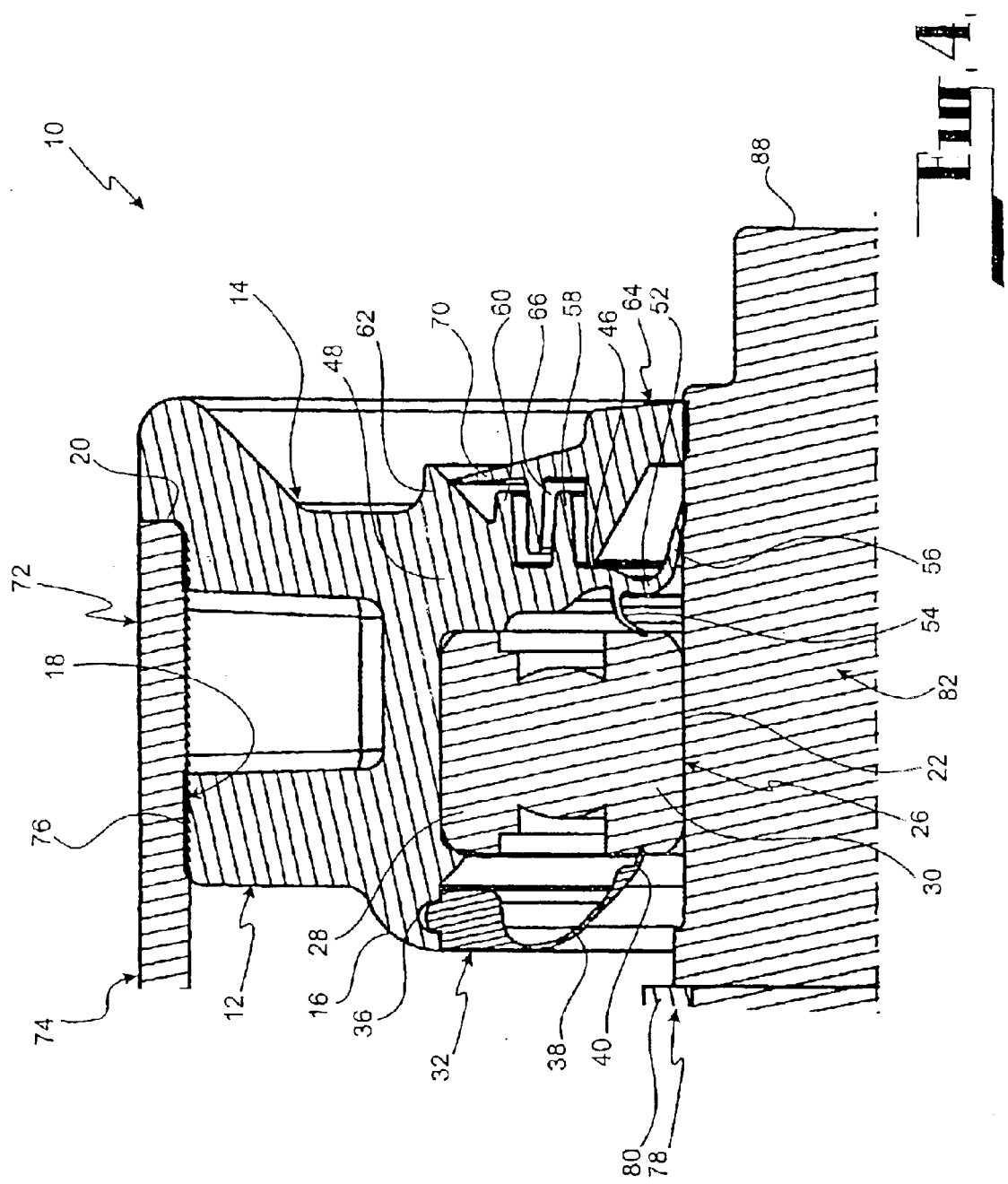
FIG. 4 is a partial cross-sectional view of the arrangement of FIG. 3.

The neck portion 46 comprises a base 48, an intermediate portion 50, and a terminal portion 52. The terminal portion 52 comprises a first seal means, for example a bearing seal rim 54 extending or curving rearwardly and inwardly, and a second seal means, for example a shaft seal rim 56 extending and curving forwardly and radially inwardly. The terminal portion 52 is formed integrally with the remainder of the neck portion 46 although importantly it is substantially thinner and consequently more flexible than the remainder of the neck portion 46. The terminal portion 52 further curves rearwardly as it extends away from the intermediate portion 50 and as it continues inwardly it curves forward to form the shaft seal rim 56, as is best seen in FIG. 4. This arrangement results in the terminal portion 52 being particularly flexible and resembling a bellows in its ability to absorb movement between the bearing 26, shaft 78 and the body portion 12. The neck portion 46 further comprises, on the forward face 14 a first annular upstand 58, a second annular upstand 60 and third annular upstand 62, each being positioned progressively radially outwardly relative to the terminal portion 52.

Figure 2:
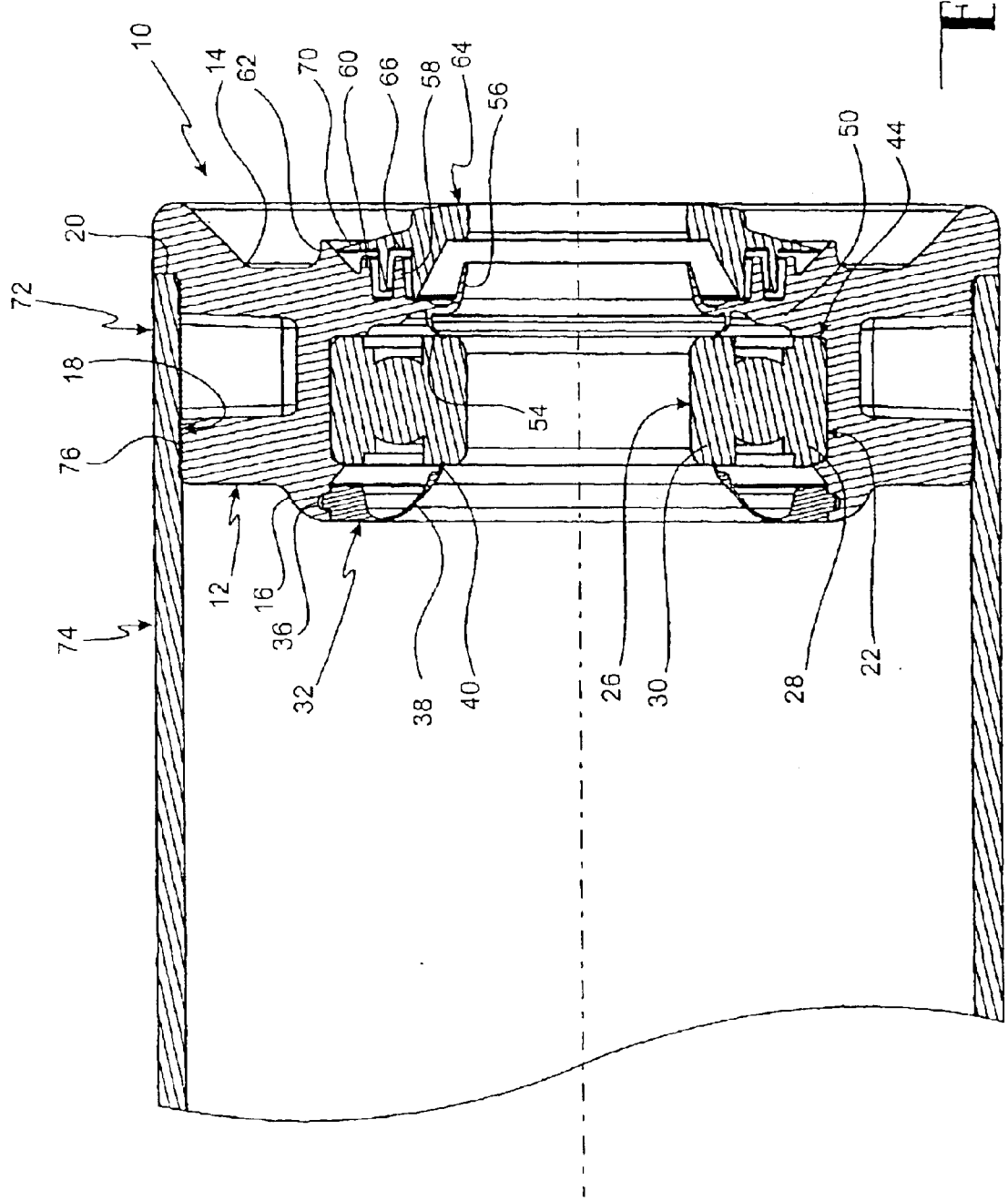
FIG. 2 is a cross-sectional view of the bearing housing of FIG. 1 press-fitted within a roller tube of a conveyor roller, showing the bearing received within the bearing housing, the inner seal means fitted to the rear face of the bearing housing and the dust seal abutting the forward face of the bearing housing.

An annular dust seal 64 is provided with a channel 66 defined in a rear face 68 thereof. The dust seal 64 further comprises a peripheral flange 70. In FIG. 2 the bearing housing 10 is shown press or interference-fitted within an end 72 of a conveyor roller tube 74. An inner surface of the conveyor roller tube 74 has provided thereon a serrated portion 76 adjacent the end 72. The serrated surface 76 acts to retain the interference-fitted bearing housing 10 in the end 72 of the conveyor roller tube 74.

Figure 3:
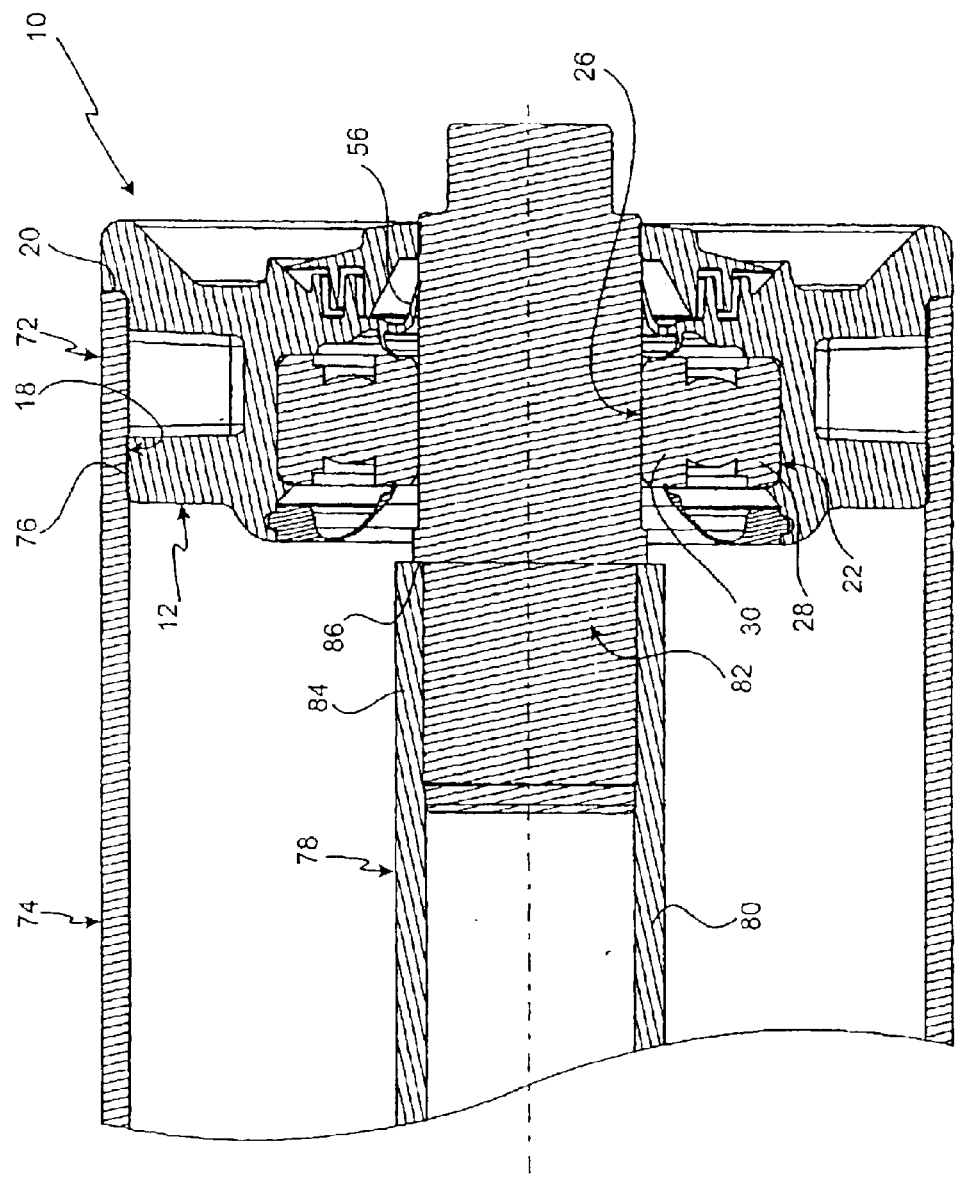
FIG. 3 is a cross-sectional view of the arrangement shown in FIG. 2 with the addition of a roller shaft about which the inner race of the bearing is located.

The manner in which the bearing seal rim 54 of the terminal portion 52 impinges upon the inner race 30 of the bearing 26 can be seen in FIGS. 2 to 4. Importantly, the bearing seal rim 54 impinges upon the inner race 30 at a gentle or low angle, certainly less than 90°, and preferably less than 45°, due to the curve thereof. Further, the relative positioning of the channel 66 and peripheral flange 70 of the dust seal 64 with respect to the upstands 58, 60 and 62 of the body portion 12 is apparent. These features interact to provide the equivalent of a labyrinth seal between the forward face 14 of the body portion 12 and the rear face 68 of the dust seal 64.

The shoulder 20 in the outer surface 18 of the body portion 12 abuts the end 72 of the conveyor roller tube 74.

In FIG. 3 there is shown the relationship between a conveyor roller shaft 78 and the bearing housing 10. The shaft 78 comprises a hollow tube 80 and stubs 82 are received within each end 84 thereof. The end 84 of the tube 80 abuts a shoulder 86 provided in the stub 82. The inner race of the bearing 26 is fitted and retained about the stub 82 of the shaft 78 as shown in FIGS. 3 and 4.

The manner in which the shaft seal rim 56 impinges upon and abuts the stub 82 is apparent in FIGS. 3 and 4, as is the press or interference-fit of the dust seal 64 about the stub 82. Importantly, the shaft seal rim 56 impinges upon the stub 82 at a gentle or low angle, certainly less than 90°, and preferably less than 45°, due to the curve provided therein.

In use, the bearing housing 10 is subject to radial loads and relative axial movement of the conveyor roller tube 74 and the roller shaft 78. The radial loads and axial movement can result in the dragging of the bearing housing 10 relative to the inner race 30 of the bearing 26. Alternately, the seal between the bearing seal rim 54 and the inner race 30 of the bearing 26 can be lost.

The specific construction of the bearing housing 10 of the present invention provides flexibility in the terminal portion 52 of the neck portion 46 relative to the remainder of the body portion 12, as described hereinbefore, thereby allowing the provision of greater interference between the bearing seal arm 54 and the inner race 30 of the bearing 26, and between the shaft seal rim 56 and the stub 82 of the shaft 78 at rest or during normal use. This increased interference is compensated for by the increased flexibility of the terminal portion 52. As such, the bearing housing 10 of the present invention provides an increased probability that the seals provided by the bearing seal rim 54 and the shaft seal rim 56 will be maintained during use, whilst also minimising the potential for drag between the inner race 30 of the bearing 26, the stub 82 of the roller shaft 78 and the terminal portion 52 of the neck portion 46.

Axial movement of the inner race 30 of the bearing 26 in an outward direction relative to the bearing housing 10 acts to further flatten out the bearing seal rim 54 against the inner race 30 whilst maintaining the seal therebetween. Inward axial movement of this type is compensated for by the level of interference between the bearing seal rim 54 and the inner race 30 at rest or during normal use. Thereby a level of axial inward movement can be tolerated whilst still maintaining an effective seal.

Similarly, axial movement of the shaft stub 82 relative to the shaft seal rim 56 is compensated for by the level of interference therebetween, and the level of flexibility provided in both the shaft seal rim 56 and the terminal portion 52 of the neck portion 46. These features also allow the maintenance of this seal with any radial movement between the shaft stub 82 and the shaft seal rim 56.

In the above manner the bearing housing 10 of the present invention reduces the need of prior art end cap assemblies for precise manufacturing tolerances in production of the seals. It is envisaged that the bearing housing 10 of the present invention will be most effective if manufactured from a polyurethane or similar material, in a single moulding. For example, the bearing housing 10 may be formed of suitable polymeric materials other than polyurethane, or a mixture thereof.

Modifications and variations such as would be apparent to the skilled addressee are considered to fall within the scope of the present invention.

What is claimed is:

1. A bearing housing comprising a body portion proportioned to receive therein a bearing, the body portion having an inwardly projecting neck portion characterised by each of a base portion, an intermediate portion and a terminal portion, the terminal portion of the neck portion being flexible relative to each of the intermediate portion, base portion, and remainder of the body portion, the terminal portion extends inwardly from the intermediate portion to form an annular shaft seal rim, an annular bearing seal rim is provided extended rearwardly from the annular shaft seal rim, wherein the bearing seal rim curves rearwardly and inwardly to impinge upon an inner race of a bearing held within the bearing housing, or the shaft seal rim curves forwardly and inwardly to impinge upon a roller shaft about which the bearing housing is rotatably arranged, or a combination thereof.

2. A bearing housing according to claim 1, wherein each seal rim impinges upon its respective seal surface at a gentle or low angle, this low angle being facilitated by the curved nature of the seal rims.

3. A bearing housing according to claim 2, wherein the low angle is below 90°.

4. A bearing housing according to claim 2, wherein the low angle is below 45°.

5. A bearing housing according to claim 1, wherein an annular inner seal means is press or snap fitted into a rear face of the bearing housing and forms a seal with the inner race of the bearing.

6. An end cap assembly for the roller tube of a roller conveyor, the end cap assembly comprising a body portion, an annular inner seal means, a bearing, and an annular dust seal, wherein the body portion is proportioned to receive therein the bearing, the body portion having an inwardly projecting neck portion characterised by each of a base portion, an intermediate portion and a terminal portion, the base portion joining the neck portion to the remainder of the body portion, the terminal portion of the neck portion being flexible relative to each of the intermediate potion, base portion and the remainder of the body portion, the terminal portion extends inwardly from the intermediate portion to form an annular shaft seal rim, an annular bearing seal rim is provided extended rearwardly from the annular shaft sel rim, wherein the bearing seal rim curves rearwardly and inwardly to impinge upon an inner race of a bearing held within the bearing housing, or the shaft seal rim curves forwardly and inwardly to impinge upon a roller shaft about which the bearing housing is rotatably arranged, or a combination thereof.

7. An end cap assembly according to claim 6, wherein each seal rim impinges upon its respective seal surface at a gentle or low angle, this low angle being facilitated by the curved nature of the seal rims.

8. An end cap assembly according to claim 7, wherein the low angle is below 90°.

9. An end cap assembly according to claim 7, wherein the low angle is below 45°.

10. An end cap assembly according to claim 6, wherein the annular inner seal means is press or snap fitted into a rear face of the bearing housing and forms a seal with the inner race of the bearing.

11. An end cap assembly according to claim 6, wherein the dust seal abuts an outer surface of the body portion.

12. An end cap assembly according to claim 11, wherein a labyrinth seal is formed thereby.

* * * * *